Feb. 8, 1955

O. J. BALTZER 2,701,875

RESISTANCE TYPE OF PHASE SHIFTER

Filed June 16, 1952

INVENTOR.
OTTO J. BALTZER
BY

Feb. 8, 1955　　　O. J. BALTZER　　　2,701,875
RESISTANCE TYPE OF PHASE SHIFTER
Filed June 16, 1952　　　　　　　　　　5 Sheets-Sheet 2

OUTPUT SIGNAL

INVENTOR.
OTTO J. BALTZER
BY

INVENTOR.
OTTO J. BALTZER

Feb. 8, 1955     O. J. BALTZER     2,701,875
RESISTANCE TYPE OF PHASE SHIFTER
Filed June 16, 1952     5 Sheets-Sheet 5

INVENTOR.
OTTO J. BALTZER

United States Patent Office

2,701,875
Patented Feb. 8, 1955

2,701,875

RESISTANCE TYPE OF PHASE SHIFTER

Otto J. Baltzer, Austin, Tex., assignor to the United States of America as represented by the Secretary of the Navy Application June 16, 1952, Serial No. 293,751

8 Claims. (Cl. 340—345)

This invention relates to an arrangement or device for converting a mechanical motion into an electrical signal whose phase is directly related to the magnitude of the mechanical motion. More particularly, this invention pertains to a reiterative potentiometer with an angular position indicator for use with, but not necessarily limited thereto, a free gyroscope in automatic control equipment.

Conventional methods and arrangements for the conversion of mechanical motion into an electrical signal include the use of a synchronous (hereinafter to be abbreviated "synchro") or resistance-type potentiometer, with the latter frequently being a "D.-C. synchro." However, only a one to one ratio between the angular motion in degrees and the electrical phase shift in degrees results from such conventional arrangements unless some type of mechanical magnification, such as a step-up gear rotor, is used between the mechanical motion to be transmitted and the electrical transmission element. The present arrangement, however, overcomes this disadvantage, and obtains a magnification in phase displacement by electrical means without having increased inertial effects produced with mechanical magnification means.

It is a principal object of the invention to provide an arrangement for translating mechanical movement, such as between a gyroscope and an airplane to be stabilized, by a resistance goniometer having a sine wave or pulsating D. C. impressed across the tapped resistance thereof to give an output signal, shifted in phase in proportion to the mechanical movement.

And another object of the invention is to provide a reiterative potentiometer having an angular position indicator.

To provide an arrangement which permits the use of a single R.-F. phase shifter for angular information in a given plane, and which, in addition utilizes a gyro stabilization scheme so that compensation signals are introduced electrically without time lag, is also another important object of this invention.

Other objects and many of the attendant advantages of this invention will be readily appreciated as the same becomes better understood by reference to the following detailed description when considered in connection with the accompanying drawings wherein.

In accordance with a preferred embodiment of the invention, a reiterative type of multi-tap resistance potentiometer element forms the basis for the arrangement or device. A source of voltage, either D.-C. or A.-C. is applied at periodical intervals to taps on this resistance potentiometer. The mechanical motion to be transmitted is then coupled to certain movable contacts, which move along the resistance potentiometer. The voltage induced across these movable contacts may be utilized in several ways if it is desired to produce or transmit an electrical signal whose phase is proportional to the motion or displacement of the movable contacts.

For example, the signal from the contacts may be used to energize the stator windings of either a two-phase synchro or a three-phase synchro. In either of these cases, if the rotor of the synchro is mechanically rotated at a frequency $f_0$, the output from the rotor will show a phase modulation which is dependent upon the component voltages in the stator windings. The output phase, consequently, will be directly related to the original mechanical motion represented by the position of the movable contacts on the resistance potentiometer.

Alternatively, if it is desirable that the angular position of the input mechanical motion be transmitted with phase multiplication to a removed location, a modification is employed in which the voltages impressed across the movable contacts are used to energize the windings of a suitable indicator device, such as a magnetic compass indicator with a permanent magnetic needle. Depending upon the number of taps upon the resistance potentiometer, the angular displacement of the output indicator will represent a magnification of the original mechanical angular motion.

Figure 1:
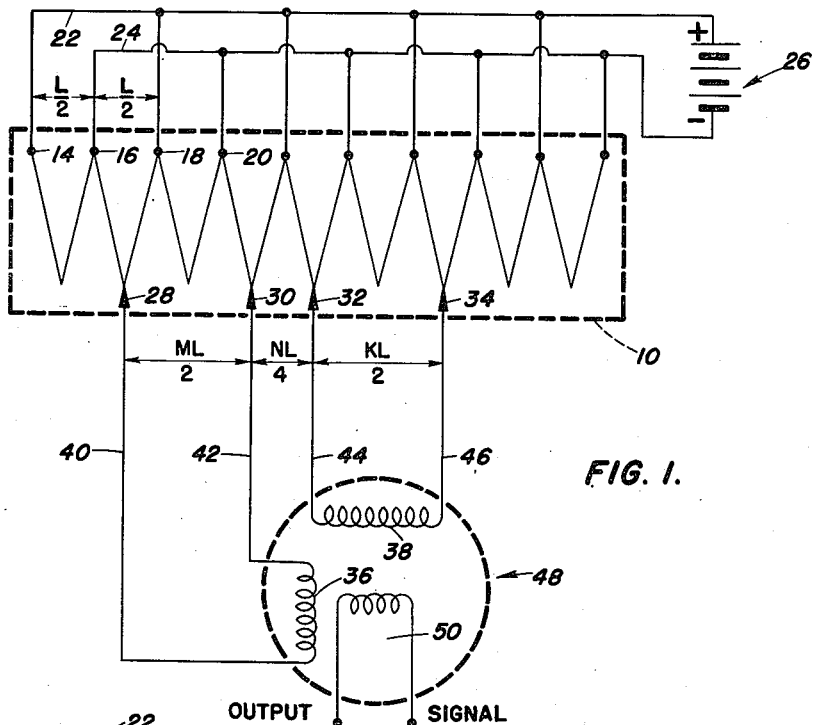
Fig. 1 is a schematic of the circuitry of a reiterative type of multi-tapped resistance potentiometer element, together with a two-phase synchro or resolver.

Referring now to the drawings, there is shown in Fig. 1 a reiterative type of multi-tap resistance potentiometer element 10, which forms the basis for a resistance type of phase shifter. Element 10 has a plurality of equally spaced taps thereon, such as 14, 16, 18, 20 and so forth. Each pair of taps, such as 14 and 16, 18 and 20, are connected through conducting elements 22, 24 to a source of voltage 26, which may be either D.-C. or A.-C. This voltage is applied at periodic intervals to the taps 14, 16, 18 and 20.

On resistor element 10 there are a plurality of movable contacts 28, 30, 32 and 34. These contacts 28, 30, 32 and 34 are mechanically coupled to the motion to be transmitted as an electrical signal, and they move along the resistance element 10. Contact pairs 28 and 30, and 32 and 34 are connected to the stator windings 36 and 38, through conductors 40 and 42, and 44 and 46, of a two-phase synchro or resolver 48, which has a rotor 50 for the output signal. Movable contacts 28, 30, 32 and 34 are separated by certain prescribed distances. For example, for best operation contacts 28 and 30 are separated by a distance given by $ML/2$, contacts 30 and 32 by $NL/4$ and contacts 32 and 34 by $KL/2$, where M, N and K are odd integers and L is the total distance for each repeating section of element 10.

Figure 2:
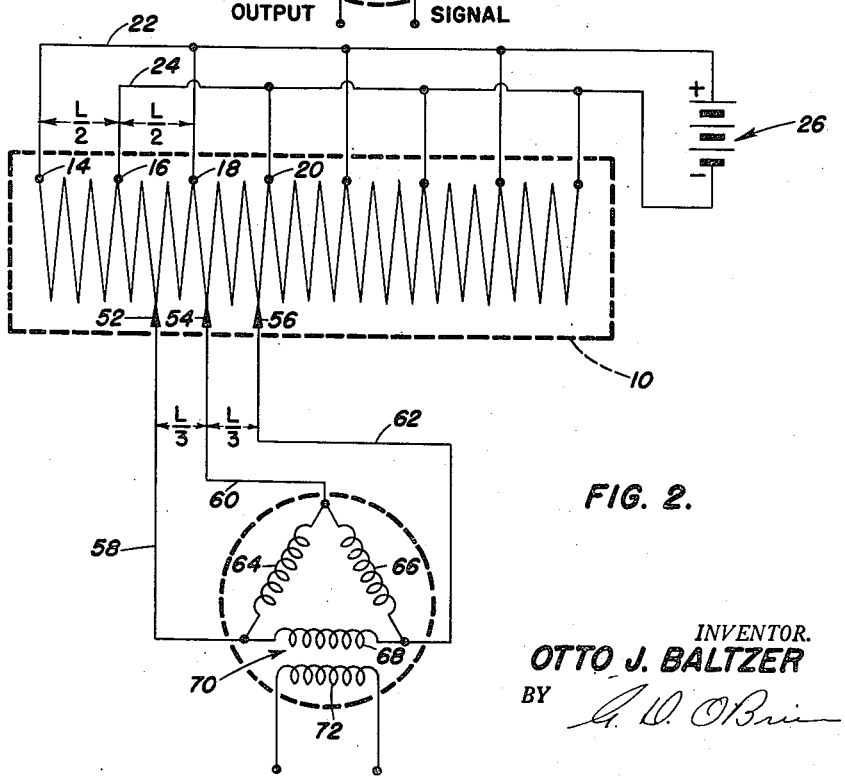
Fig. 2 is a schematic of the circuitry of the resistance potentiometer element as shown in Fig. 1, together with a three-phase synchro.

In Fig. 2, there is shown a resistance potentiometer element 10, connected substantially as in Fig. 1, except that only three movable contacts 52, 54 and 56 are provided thereon. These contacts 52, 54 and 56 are also mechanically coupled to the motion to be transmitted as an electrical phase shifted signal, such as for contacts 28, 30, 32 and 34 on Fig. 1. The potentials derived from contacts 52, 54 and 56 are utilized through conductors 58, 60 and 62 to energize the stator windings 64, 66 and 68 of the three-phase synchro or resolver 70. The output signal is taken from rotor 72 of synchro 70. In this arrangement, the distance between movable contacts 52 and 54 is given by $L/3$, and between 54 and 56 by $L/3$.

As indicated above, the voltage induced across movable contacts 28, 30, 32 and 34 of Fig. 1, or movable contacts 52, 54 and 56 of Fig. 2, may be utilized in several ways if it is desired to produce or transmit an electrical signal whose phase is proportional to the motion or displacement of the movable contacts, respectively. Thus, as pointed out above, the signal from contacts 28, 30, 32 and 34, may be used to energize the stator windings of either the two-phase synchro 48 of Fig. 1 or the three-phase synchro 70 of Fig. 2. In either of these cases, if the rotor, such as 50 or 72, of the synchro 48 or 70, is mechanically rotated at a frequency $f_0$, the output of the rotor 50 or 72 will show a phase modulation which is dependent upon the component voltages of stator windings 36 and 38, or 64, 66 and 68, respectively. The output phase, consequently, will be directly related to the original mechanical motion represented by the movable contacts 28, 30, 32 and 34 or 52, 54 and 56 of the resistance potentiometer elements of the arrangements illustrated in Figs. 1 and 2.

Figure 3:
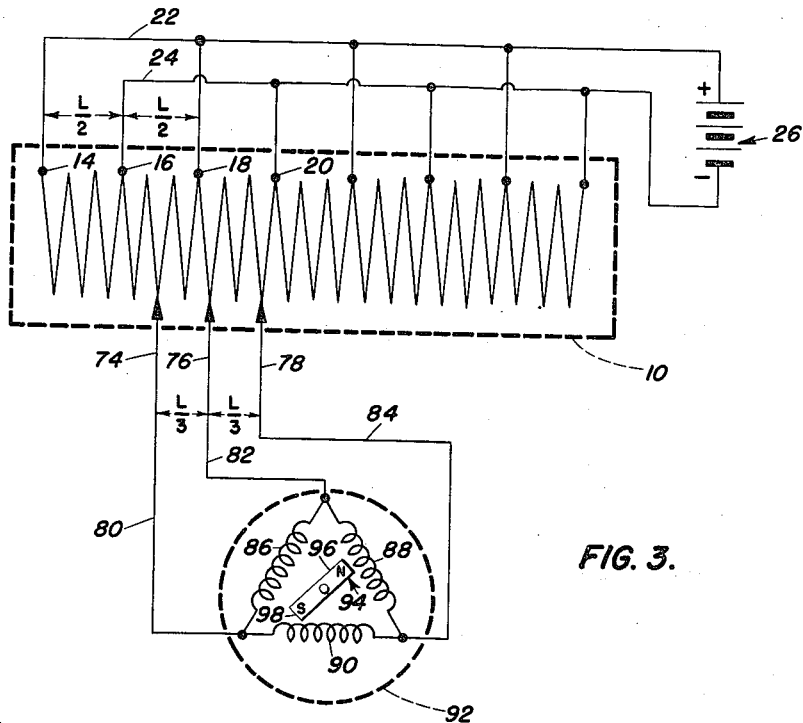
Fig. 3 illustrates a schematic of the potentiometer element as shown in Fig. 1, together with a magnetic field indicator.

Alternatively, if it is desirable that the angular position of the input mechanical motion be transmitted with phase multiplication to a removed location, the arrangement shown in Fig. 3 may be employed. The voltages impressed across the movable contacts 74, 76 and 78 are used through conductors 80, 82 and 84, to energize the windings 86, 88 and 90, of a suitable indicating device 92, such as a magnetic compass indicator with a permanent magnetic needle 94 having a north pole 96 and a south pole 98. Depending upon the number of taps 14, 16, 18 and 20, on the resistance potentiometer element 10 in Fig. 3, the angular displacement of the output indicator 92 will represent a magnification of the original mechanical angular motion. The distance between movable contacts 74 and 76, in this arrangement, is given by $L/3$ and between contacts 76 and 78 by $L/3$.

Figure 4:
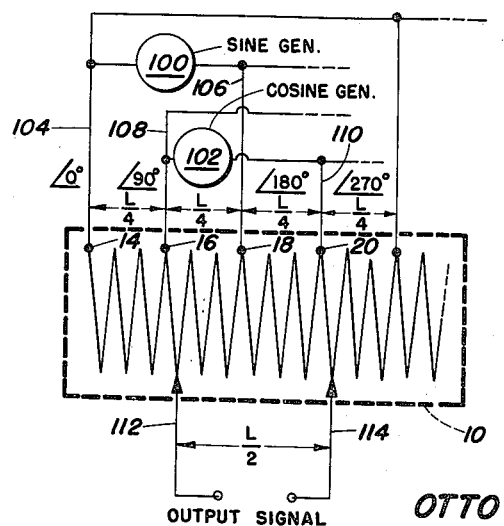
Fig. 4 is a schematic of the circuitry for the potentiometer element shown in Fig. 1, in which electrical generators are furnishing signals in electrical quadrature thereto.
Figure 5:
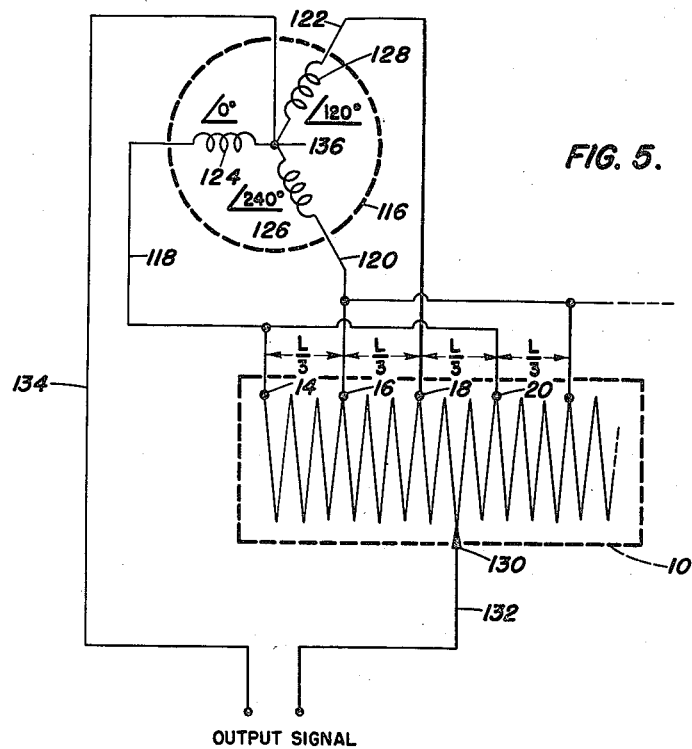
Fig. 5 is a schematic of the circuitry of the potentiometer element as shown in Fig. 1 in which a generator is producing three (3)-phase signals which are used for the energization of the potentiometer.

Figs. 4 and 5 show two arrangements in which alternating current voltages are used to energize the reiterative resistance potentiometer element 10. In these arrangements, a mechanical motion of the movable contacts will produce a phase modulation in the alternating current signal.

Fig. 4, for example, shows electrical sine and cosine generators 100 and 102 which are utilized for furnishing signals in electrical quadrature to the resistance potentiometer element 10, through conductors 104 and 106, and 108 and 110, which are connected to taps 14 and 18, and 16 and 20, respectively. The output signal is picked-off from element 10 by means of movable contacts 112 and 114 which are mechanically coupled to the motion to be transmitted as an electrical signal. When the sine-cosine generators 100 and 102 have a common center tapped reference point, movable contacts 112 may be replaced by a connection to the common reference point.

The arrangement in Fig. 5 is quite similar to that in Fig. 4 except that a generator 116 producing three (3)-phase signals is used in energizing the resistance element 10 through conductors 118, 120 and 122 which are connected between the windings 124, 126 and 128, to generator 116 and taps 14, 16 and 18 of element 10, respectively. Movable contact 130 is coupled to the motion to be transmitted by means of conductor 132, while conductor 134 is connected to the junction point 136 of windings 124, 126 and 128. The output signal in this arrangement from conductors 132 and 134 will be shifted in electrical phase, $\Delta\phi$ by the approximation $$\Delta\phi = 360° \times \frac{\Delta L}{L}$$

where $\Delta\phi$ is the electrical degrees and $\Delta L$ represents the relative displacement of the movable contact 130.

As previously pointed out, the mechanical motion of movable contacts 112 and 114, and 130 of the arrangements shown in Figs. 4 and 5 will produce a phase modulation in the alternating current signal.

Figure 6:
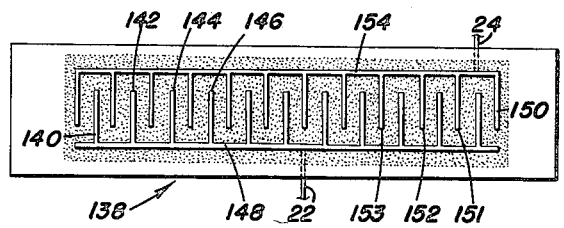
Fig. 6 illustrates a schematic of a composition resistance potentiometer element.

The multi-tapped resistance potentiometer element 10 used in the resistance type of phase shifter may employ the standard wire-wound potentiometer techniques, or, alternatively, may be a composition resistance potentiometer element 138, as indicated in Fig. 6.

This composition potentiometer element 138 may be fabricated by first placing conducting lines, such as 140, 142, 144 and 146, from a main conducting line 148, or 150, 151, 152, 153 from conducting line 154 on a suitable insulating base material. Conducting lines 148 and 154 would be energized as indicated by conductors 22 and 24 from source 26 of Figs. 2 and 3. These conducting lines 140, 142, 144, and so forth, may be formed by the painting or spraying of conductive paint, by the scribing of the base material and the filling-in of the etched lines by conducting material, or by an evaporating or sputtering process of a suitable metallic substance. A resistance coating similar to that used on carbon potentiometers may then be supplied over these conducting lines.

As indicated on the drawings of Figs. 1 through 5, the fixed taps and the movable contacts must be spaced by an appropriate distance for proper operation of the device.

Figure 7:
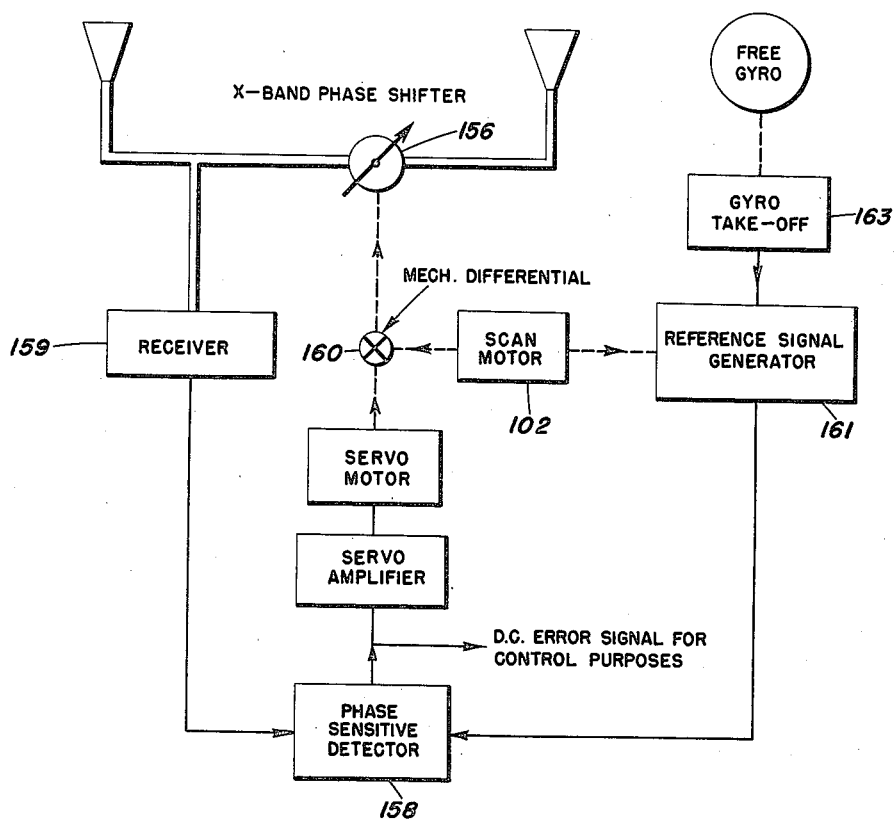
Fig. 7 illustrates a schematic of a phase sensitive, scanning interferometer with electrical gyro stabilization, embodying the invention.
Figure 8:
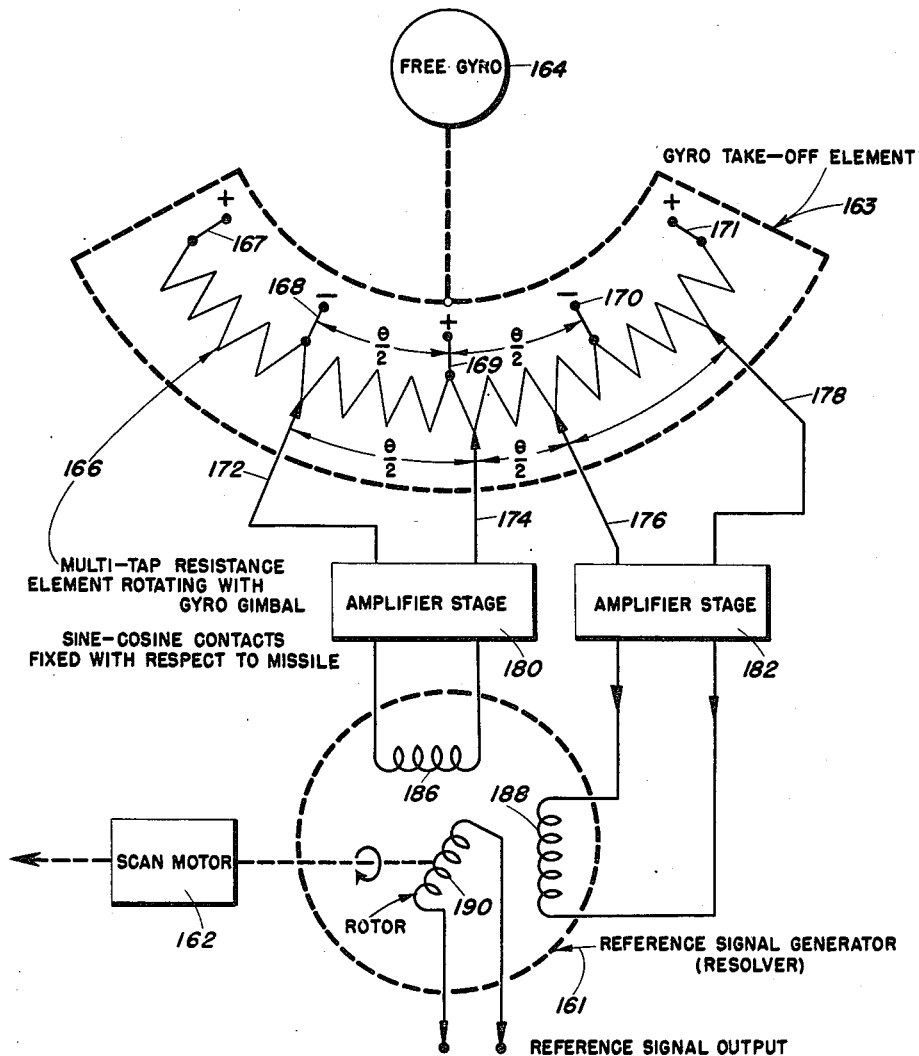
Fig. 8 shows an enlargement of the gyro take off element of Fig. 7 in greater detail.

The operation of the device for the translation of mechanical movement such as between a gyro and an airplane, or between a gyro and an aerial missile to be stabilized will now be described by reference to the arrangment shown in Figs. 7 and 8. The arrangement shown in Figs. 7 and 8 permits the use of a single R.-F. phase shifter 156 for angular information in a given plane, and which, in addition, utilizes a gyro stabilization scheme so that compensation signals are introduced without time lag. In the arrangement shown in Fig. 7, a phase sensitive detector or phase comparator 158 is used to determine the phase of the signal envelope received by receiver 159 relative to a reference signal. The $\pm$D.-C. output signal from the phase detector 158 may be used as an error voltage to control flap deflections of an aerial missile and to position a phase shifter.

The phase follow-up is introduced through a mechanical differential 160 into the common R.-F. phase shifter 156. A reference signal generator 161 is used as a single side band modulating device to combine the angular rotational frequency of the scan motor 162 with the phase shift derived from the gyro take-off element or resistance potentiometer element 163. Thus multitapped element 163, which is best seen in Fig. 8, with its alternate taps 167, 168, 169, 170, 171 at definite positions as previously pointed out for a negative and a positive voltage source, such as generator or the like, rotates with the free gyro gimbal (not shown). Two pairs of contacts 172 and 174, and 176 and 178, fixed with respect to the gyro case and a missile frame (not shown), are used to get the equivalent of sine and cosine components. The voltage impressed across the contacts 172, 174, 176 and 178 as the missile rotates will have a linear sawtooth rather than a sinusoidal wave form.

The separation between the contacts 172 and 174, 174 and 176, and 176 and 178, as previously indicated in Figs. 1 through 5, is chosen so that the voltage difference across the contacts 172, 174, 176 and 178 goes through a complete cycle as the missile yaws through a complete antenna lobe width. This means for a spacing of 15 wavelengths at ultra high frequency that the output D.-C. signal from a given pair of contacts, say 172 and 174, changes from positive to negative and back again to positive if the gyro case rotates through approximately 4°.

The separate "sine" and "cosine" component voltages, after amplification in amplifiers 180 and 182 of each contact pair 172 and 174, and 176 and 178, are then applied to the windings of the two-phase resolver 161 having field coils 186 and 188 which are in space quadrature. When the rotor 190 of the resolver 161 is rotated at the frequency of the scan motor 162, the output voltage waveform from the rotor 190 will be shifted in phase according to the motion of the free gyro 164. Thus this arrangement operates as a single side band modulator which produces the desired gyro compensated phase shift in the reference signal.

Obviously many modifications and variations of the present invention are possible in the light of the above teachings. It is therefore to be understood that within the scope of the appended claims, the invention may be practiced otherwise than as specifically described.

What is claimed is:

1. In a phase shifter for producing an angular position indication, a reiterative potentiometer comprising a base having thereon a pair of recurrent patterns of conductive elements, said conductive elements of each pattern being substantially parallel and evenly spaced, and resistance material distributed over said base in contact with said conductive elements.

2. In a phase shifter for producing an angular position indication, a reiterative potentiometer comprising a non-conducting base having thereon a pair of recurrent patterns of conductive elements, said conductive elements of each pattern being substantially parallel and evenly spaced, and resistance material distributed over said base in contact with said conductive elements.

3. In a phase shifter for producing an angular position indication of an aerial missile, a reiterative potentiometer comprising a base of non-conducting material, a pair of recurrent patterns of conductive elements mounted on said base, each of said patterns having the elements in said patterns connected electrically to each other on said base, said conductive elements in each pattern being substantially parallel and evenly spaced, with said conductive elements of one pattern being alternately arranged with respect to said conductive element of the other pattern, and resistance material distributed over said base in contact with said conductive elements.

4. In an arrangement for converting a mechanical motion into an electrical signal whose phase is directly related to the magnitude of said mechanical motion, a source of mechanical energy, a multi-tapped resistance potentiometer member including a base of non-conducting material, a pair of recurrent patterns of substantially parallel conductive elements thereon, resistance material distributed over said base in contact with said conductive elements, a source of voltage applied to said taps of said member, and movable contacts on said member mechanically coupled to said source of mechanical energy to be transmitted as an electrical signal.

5. In an arrangement for converting a mechanical motion into an electrical signal whose phase is directly related to the magnitude of said mechanical motion, a source of mechanical energy, a multi-tapped resistance potentiometer member having a non-conducting base and a pair of recurrent patterns of substantially parallel and evenly spaced conductive elements thereon, a source of voltage applied to the taps of said member, and movable contacts on said member mechanically coupled to the source of said mechanical energy to be transmitted as an electrical signal.

6. In an arrangement for converting a mechanical motion into an electrical signal whose phase is directly related to the magnitude of said mechanical motion, a source of mechanical energy, a multi-tapped resistance potentiometer member having a non-conducting base and a pair of recurrent patterns of conductive elements thereon, said conductive elements of each pattern being substantially parallel and evenly spaced, with said conductive elements of one pattern being arranged alternately with said conductive elements of the other pattern, a source of voltage applied to said taps of said member, movable contacts on said member mechanically coupled to the source of said mechanical energy to be transmitted as an electrical signal, and resistance material distributed over said base in contact with said conductive elements.

7. In an arrangement for converting a mechanical motion into an electrical signal whose phase is directly related to the magnitude of said mechanical motion, a source of mechanical movement, a multi-tapped potentiometer including a base having a pair of recurrent patterns of substantially parallel and evenly spaced conductors thereon, resistance material on said base and in contact with said conductors, movable contacts on said potentiometer mechanically coupled to said source of mechanical movement to be transmitted as an electrical signal, and a source of voltage impressed across the taps of said potentiometer to give an output signal shifted in phase in proportion to said mechanical movement to be transmitted.

8. In a phase shifter, a synchronous generator having a rotor and a pair of stator windings, a multi-tapped potentiometer including a base having a pair of recurrent patterns of substantially parallel and evenly spaced conductors thereon, resistance material on said base and in contact with said conductors, a source of voltage connected to said taps on said potentiometer, movable contacts on said potentiometer mechanically coupled to a source of mechanical movement to be transmitted, and means connected to said stator windings and other taps on said potentiometer, whereby the phase of an output signal from said rotor is shifted in phase in proportion to said mechanical movement to be transmitted.

References Cited in the file of this patent

UNITED STATES PATENTS

| 1,647,474 | Seymour | Nov. 1, 1927 |
| 2,172,395 | McSpadden | Sept. 12, 1939 |
| 2,229,449 | Garman | Jan. 21, 1941 |
| 2,248,616 | Faus | July 8, 1941 |
| 2,510,087 | De Rosa | June 6, 1950 |

FOREIGN PATENTS

| 871,729 | France | May 7, 1942 |
| 880,563 | France | Mar. 30, 1943 |